United States Patent
Chen et al.

(10) Patent No.: US 8,702,353 B2
(45) Date of Patent: Apr. 22, 2014

(54) TANGENTIAL CUTTING INSERT AND MILLING CUTTER

(75) Inventors: Danny Chen, Nahariya (IL); Amir Satran, Kfar Vradim (IL); Alexander Zibenberg, Nahariya (IL)

(73) Assignee: Iscar, Ltd., Tefen (IL)

( * ) Notice: Subject to any disclaimer, the term of this patent is extended or adjusted under 35 U.S.C. 154(b) by 116 days.

(21) Appl. No.: 13/341,768

(22) Filed: Dec. 30, 2011

(65) Prior Publication Data

US 2012/0195700 A1  Aug. 2, 2012

(30) Foreign Application Priority Data

Jan. 31, 2011  (IL) .......................................... 210966

(51) Int. Cl.
*B23C 5/06* (2006.01)
*B23C 5/22* (2006.01)

(52) U.S. Cl.
USPC .......................................... 407/113; 407/114

(58) Field of Classification Search
USPC .................. 407/113, 114, 115, 116
See application file for complete search history.

(56) References Cited

U.S. PATENT DOCUMENTS

| | | | |
|---|---|---|---|
| 5,333,972 A | 8/1994 | Bernadic et al. | |
| 6,238,146 B1 * | 5/2001 | Satran et al. | 407/113 |
| 6,974,280 B2 * | 12/2005 | Satran et al. | 407/42 |
| 7,909,544 B2 * | 3/2011 | Jansson | 407/42 |
| 8,202,026 B2 * | 6/2012 | Satran et al. | 407/113 |
| 2008/0226403 A1 * | 9/2008 | Craig | 407/113 |
| 2011/0052337 A1 | 3/2011 | Dudzinsky et al. | |

FOREIGN PATENT DOCUMENTS

| | | |
|---|---|---|
| EP | 0 769 341 | 4/1997 |
| JP | 10 118824 | 5/1998 |
| JP | 2006 281433 A | 10/2006 |
| WO | WO 2012/014977 | 2/2012 |

OTHER PUBLICATIONS

Internaitonal Search Report dated Mar. 30, 2012 issued in PCT counterpart application No. PCT/IL2012/000002.

* cited by examiner

*Primary Examiner* — Will Fridie, Jr.
(74) *Attorney, Agent, or Firm* — Womble Carlyle

(57) ABSTRACT

A tangential cutting insert has two opposing side surfaces and a peripheral surface extending between the side surfaces. The peripheral surface has four identical end surfaces. The intersections of the end and side surfaces include major cutting edges. The intersection of end surfaces and adjacent end surfaces include minor cutting edges. Each of the major and minor cutting edges has a rake surface extending in an inward direction of the cutting insert. In a side view of the cutting insert the major cutting edges are concave.

10 Claims, 4 Drawing Sheets

TANGENTIAL CUTTING INSERT AND MILLING CUTTER

FIELD OF THE INVENTION

The present invention relates to a tangential cutting insert for use in milling operations and a milling cutter for the tangential cutting insert.

BACKGROUND OF THE INVENTION

Tangential cutting inserts, are oriented in an insert holder in such a manner that during a cutting operation on a workpiece the cutting forces are directed along a major (thicker) dimension of the cutting insert. An advantage of such an arrangement is that the cutting insert can withstand greater cutting forces than when oriented in such a manner that the cutting forces are directed along a minor (thinner) dimension of the cutting insert.

There is disclosed in EP 0 769 341 a face milling cutter employing a double-sided indexable tangential cutting insert having a prismoidal shape with two opposed generally rectangular rake surfaces connected by side surfaces. The cutting insert has a basic "negative" geometry and therefore in order to provide the necessary clearance between the cutting insert and the workpiece, when mounted in a face-mill, the cutting insert is oriented with a negative axial rake angle.

A double-sided indexable tangential cutting insert for a boring tool head is disclosed in U.S. Pat. No. 5,333,972. The insert is provided at each end with a protruding flat island. Each long cutting edge is inclined at an angle of 3° relative to the protruding flat island, defining an "insert axial rake angle". Rearward of each cutting edge is a descending land surface that merges with an increasing incident angle surface to form a chip breaker groove. Each increasing incident angle surface extends from its associated descending land surface to an adjacent island, at either the top or the bottom of the cutting insert. The cutting insert is left or right handed. It is manufactured to be right-handed and, when flipped around, is left-handed. It will be appreciated that the magnitude of the insert axial rake angle is limited for practical reasons. Any increase in the insert axial rake angle will result in an increase in the "vertical" extent of the increasing incident angle surface (see FIG. 3 of U.S. Pat. No. 5,333,972) that will have an adverse effect on chip development and evacuation.

There is disclosed in U.S. Pat. No. 6,238,146 a tangential cutting insert having front and rear surfaces of a generally concave shape. Opposite upper and lower surfaces and a pair of opposite side surfaces extend between the front and rear surfaces. There are four main cutting edges that are concave in a side view of the cutting insert. Each main cutting edge extends between two corner cutting edges. Each major cutting edge merges with an associated auxiliary cutting edge via a corner cutting edge. All the cutting edges are associated with the front and rear surfaces which have rake surfaces formed in them along which chips cut from a workpiece flow during a cutting operation. The upper, lower surfaces and side surfaces do not have rake surfaces formed in them and there are no cutting edges associated with the upper, lower surfaces and side surfaces.

Although the cutting inserts shown in the various embodiments in U.S. Pat. No. 6,238,146 have eight cutting corners, it is only possible to use all eight cutting corners if only half the length of the main cutting edges is used. Cutting edges become worn during use. Moreover, in U.S. Pat. No. 6,238,146 each main cutting edge has associated with it two cutting corners, one at each extremity. Hence, if more than half the length of the main cutting edges is used, say in milling a shoulder in a workpiece, then when using a second cutting corner of a main cutting edge, for which the first corner has already been used, only a small portion of the main cutting edge adjacent the second cutting corner will be new, the rest of the main cutting edge will be used and worn.

It is an object of the present invention to provide an indexable tangential cutting insert having eight main cutting edges, each main cutting edge having a single cutting corner associated with it.

It is a further object of the present invention to provide an indexable tangential cutting insert capable of milling a square shoulder in a workpiece.

SUMMARY OF THE INVENTION

In accordance with the present invention there is provided a tangential cutting insert comprising two opposing side surfaces and a peripheral surface extending therebetween. The peripheral surface comprises four identical end surfaces, each end surface extends between two adjacent end surfaces. Each end surface and each side surface intersect at a major edge. At least a portion of the major edge is a major cutting edge.

Each end surface and each adjacent end surface intersect at a minor edge. At least a portion of the minor edge is a minor cutting edge. The major cutting edges are longer than the minor cutting edges.

Each of the major and minor cutting edges of a respective end surface has a rake surface associated therewith in the respective end surface. The rake surface extends in an inward direction of the cutting insert.

In a side view of the cutting insert the major cutting edges are concave.

In accordance with some embodiments, the cutting insert has a through bore extending between the side surfaces. The through bore has a bore axis B about which the cutting insert has 90° rotational symmetry.

In accordance with some embodiments, adjacent major and minor cutting edges merge at a corner cutting edge.

By one embodiment, the rake surface extends to an inner end surface of the end surface In accordance with some embodiments, a given major cutting edge is formed at the intersection of the rake surface and a major relief surface and a given minor cutting edge is formed at the intersection of the rake surface and a minor relief surface, wherein the major relief surface is located in a side surface, the minor relief surface is located in an end surface.

In accordance with some embodiments, each minor cutting edge is formed at the intersection of a minor rake surface and a minor relief surface, the minor rake surface being located in the rake surface of one end surface and the minor relief surface being located in an adjacent end surface, wherein the minor relief surface forms a support region for the minor cutting edge. The support region is elevated relative to an adjacent minor rake surface located in the adjacent end surface.

In accordance with some embodiments, adjacent major and minor cutting edges merge at a corner cutting edge and each major cutting edge is located between a corner cutting edge and a corner non-cutting edge.

Typically, each end surface comprises exactly two diagonally opposing corner cutting edges and exactly two diagonally opposing corner non-cutting edges.

In accordance with the present invention there is also provided a milling cutter comprising:

at least one tangential cutting insert in accordance with embodiments of the invention; and at least one insert pocket in which the tangential cutting insert is retained. The insert pocket comprises generally convex adjacent upper and rear walls oriented transversely to a base wall. The upper wall comprises two protruding axial location surfaces, located on either side of an upper central region of the upper wall, a rear axial location surface adjacent the pocket rear wall and a forward axial location surface distal the pocket rear wall. The rear wall comprises two protruding tangential location surfaces, located on either side of a rear central region of the rear wall, an upper tangential location surface adjacent the pocket upper wall and a lower tangential location surface distal the pocket upper wall; wherein the rear wall faces a first end surface having a first inner end surface and the upper wall faces a second end surface having a second inner end surface that is adjacent the first end surface.

When the cutting insert is secured in the insert pocket the rear wall engages the first inner end surface, the upper wall engages the second inner end surface and the base wall engages a radially inner side surface of the cutting insert. The upper tangential location surface abuts the first inner end surface at an upper tangential abutment surface and the lower tangential location surface abuts the first inner end surface at a lower tangential abutment surface; wherein the cutting insert is moveable from a first position obtained by tightening a clamping screw by clockwise screw rotation to a second position created by cutting forces operating on the cutting insert during a cutting operation; wherein in the first position the forward axial location surface abuts the second inner end surface at a forward axial abutment surface and a gap is formed between the rear axial location surface and a rear axial abutment surface of the second inner end surface; and in the second position the rear axial location surface abuts the rear axial abutment surface and a gap is formed between the forward axial location surface and the forward axial abutment surface.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
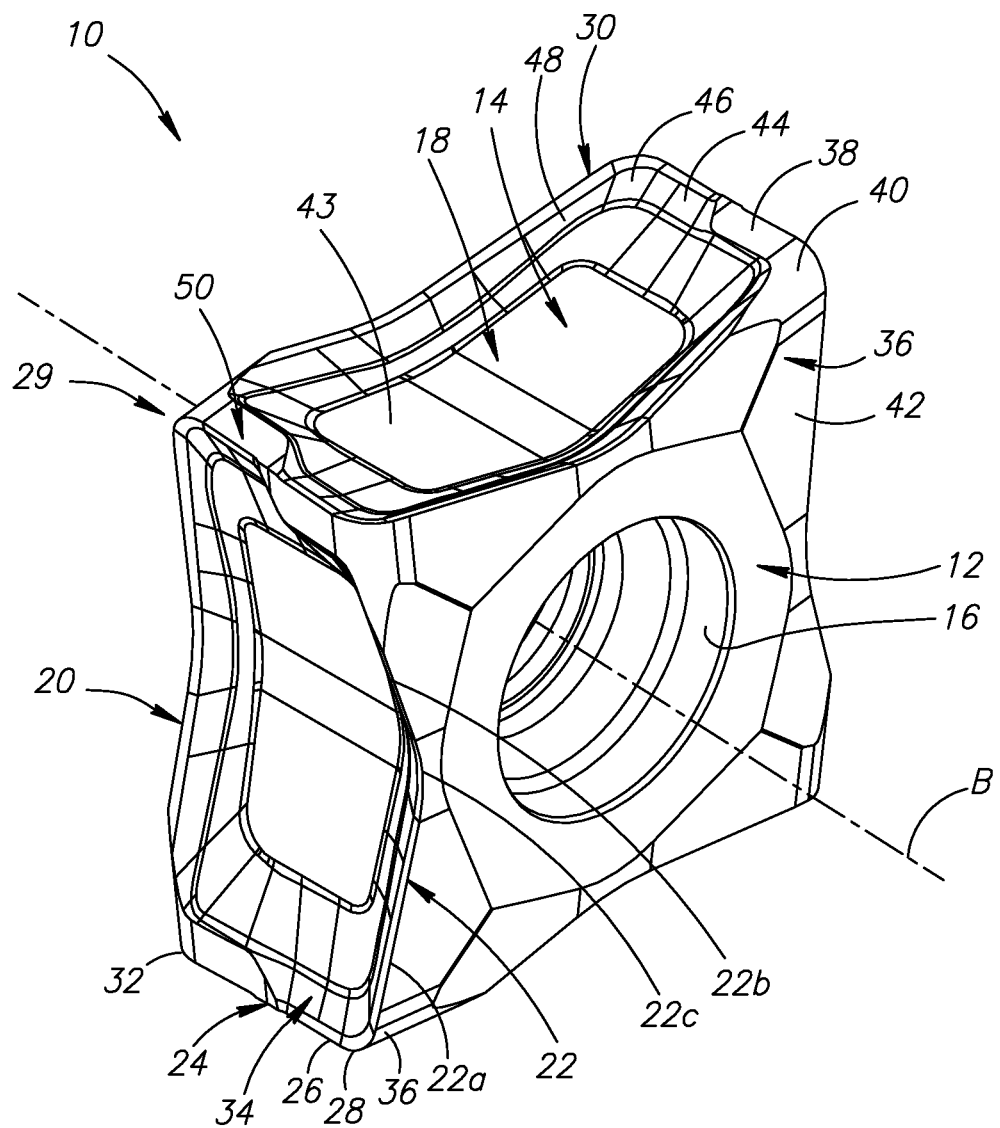
FIG. 1 is a perspective view of a cutting insert in accordance with embodiments of the present invention.
Figure 2:
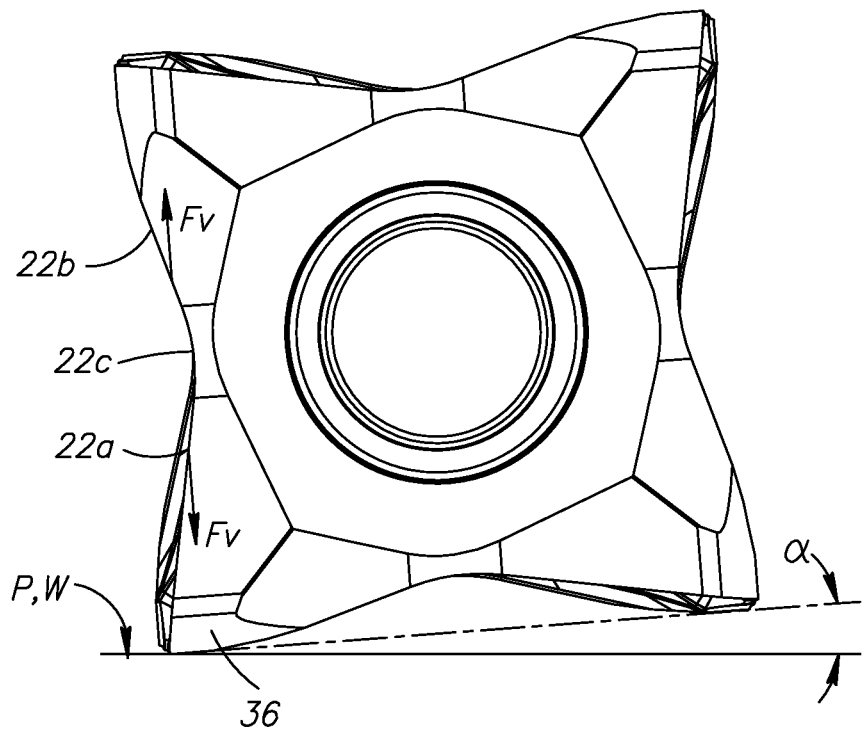
FIG. 2 is a side view of a cutting insert in accordance with embodiments of the present invention.
Figure 3:
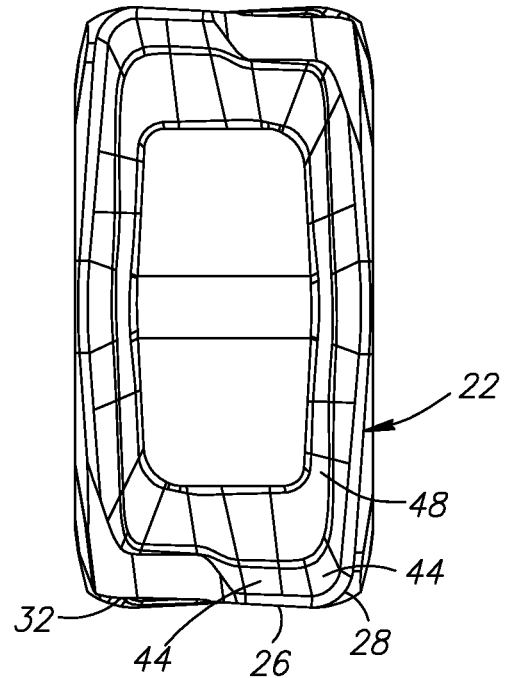
FIG. 3 is an end view of a cutting insert in accordance with embodiments of the present invention.

Reference is first made to FIGS. 1 to 3 showing a tangential cutting insert 10 in accordance with embodiments of the invention. The cutting insert 10 has two opposing side surfaces 12 and a peripheral surface 14 extending therebetween. The cutting insert 10 has a through bore 16 extending between the side surfaces 12. The through bore 16 has a bore axis B about which the cutting insert 10 has 90° rotational symmetry. The peripheral surface 14 has four identical end surfaces 18. Each end surface 18 extends between two adjacent end surfaces 18 so that there are no intervening surfaces between adjacent end surfaces 18. Each end surface 18 and each side surface 12 intersect at a major edge 20. Each end surface 18 has two major edges 20 and the cutting insert 10 has a total of eight major edges 20. At least a portion of each major edge 20 forms a major cutting edge 22. Each major cutting edge 22 extends over more than half the length of the major edge 20 on which it is formed.

Adjacent end surfaces 18 intersect at a minor edge 24. The minor edge 24 includes exactly two minor cutting edges 26. One of the two minor cutting edges 26 belongs to one of the adjacent end surfaces 18 and the other one of the two minor cutting edges 26 belongs to the other one of the adjacent end surfaces 18. The major cutting edges 22 are longer than the minor cutting edges 26. Each minor cutting edge 26 has an adjacent major cutting edge 22. Adjacent major and minor cutting edges 22, 26 have an associated corner cutting edge 28 that extends between the adjacent major and minor cutting edges 22, 26. In other words, adjacent major and minor cutting edges 22, 26 merge at a corner cutting edge 28. In accordance with some embodiments, the corner cutting edge 28 may be curved. In accordance with some embodiments, the corner cutting edge 28 may have a given radius of curvature. The corner cutting edge 28 is located at a corner 29 of the cutting insert 10. Each triplet of adjacent major and minor cutting edges 22, 26 and associated corner cutting edge 28 forms an insert cutting edge 30. Each end surfaces 18 has two insert cutting edges 30 and the cutting insert 10 has in total eight insert cutting edges 30. Each end surface 18 has exactly two diagonally opposing corner cutting edges 28 and exactly two diagonally opposing corner non-cutting edges 32. The cutting insert 10 has in total eight corner cutting edges 28. Each major edge 20 is located between a corner cutting edge 28 and a corner non-cutting edge 32. Each major cutting edge 22 merges with a single corner cutting edge 28.

Each insert cutting edge 30 is formed at the intersection of a rake surface 34 and a relief surface 36. The relief surface 36 associated with an insert cutting edge 30 may be divided into three portions: a minor relief surface 38, a corner relief surface 40 and a major relief surface 42 associated respectively with a minor cutting edge 26, a corner cutting edge 28 and a major cutting edge 22. For each end surface 18 the insert cutting edges 30 have an associated rake surface 34 in the end surface 18. The rake surface 34 extends from each insert cutting edge 30 in an inward direction of the cutting insert 10. In accordance with some embodiments, the rake surface 34 extends towards an inner end surface 43 of the end surface 18. In accordance with some embodiments, the rake surface 34 extends to the inner end surface 43 of the end surface 18. The rake surface 34 of an insert cutting edge 30 may be divided into three portions: a minor rake surface 44, a corner rake surface 46 and a major rake surface 48 associated respectively with a minor cutting edge 26, a corner cutting edge 28 and a major cutting edge 22.

The major relief surface 42 is located in a side surface 12, the minor relief surface 38 is located in an end surface 18 and the corner relief surface 40 extends between the major and minor relief surfaces 38. The minor relief surface 38 forms a support region 50 in the end surface 18, to provide support for the minor cutting edge 26 against cutting forces operating on the minor cutting edge 26 during a cutting operation. In any end surface 18, the support region 50 is elevated relative to an adjacent minor rake surface 44 in that end surface 18.

With reference to FIG. 2 it can be seen that in a side view of the cutting insert 10 the major cutting edges 22 are concave. The major cutting edges 22 have two sections, a first major cutting edge section 22a and a second major cutting edge section 22b. A transition edge 22c connects between the first and second major cutting edge sections 22a, 22b. In accordance with some embodiments the transition edge 22c is concave in a side view of the cutting insert 10.

Figure 4:
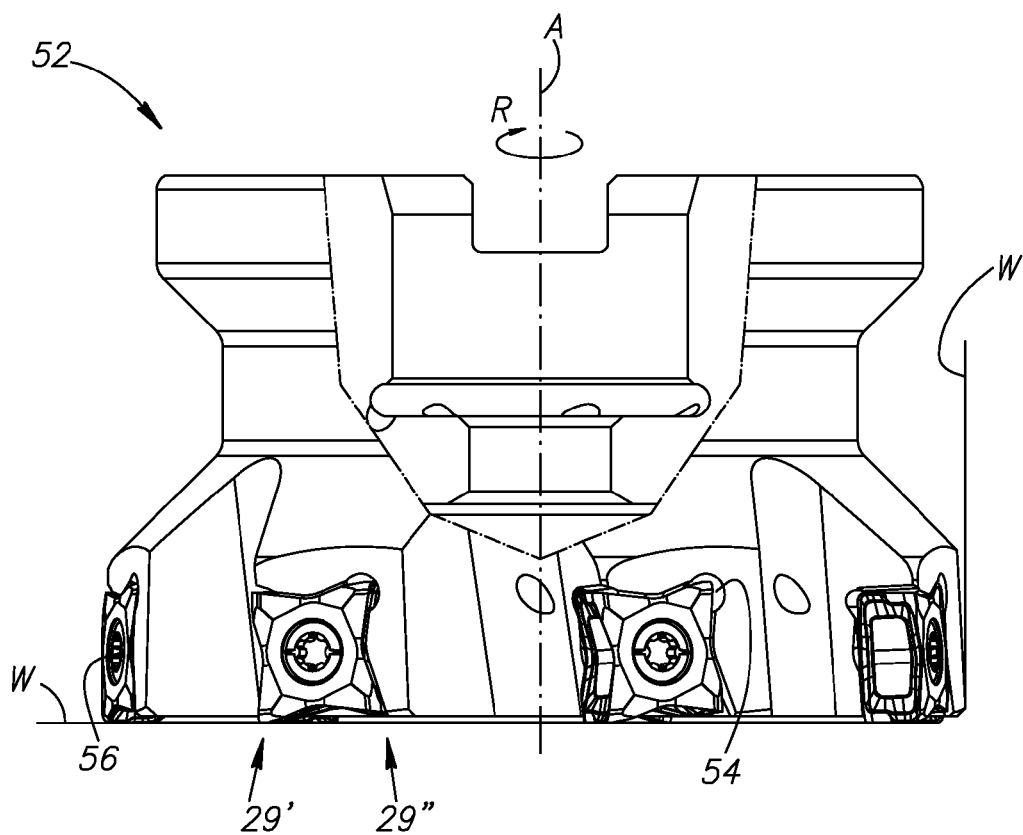
FIG. 4 is a side view of a milling cutter in accordance with embodiments of the present invention.

The orientation of the cutting insert 10 in the side view shown in FIG. 2 is the orientation of the cutting insert 10 seen in a side view when mounted in a milling cutter 52, as shown in FIG. 4, in accordance with a specific application of the invention. The milling cutter 52 has an axis of rotation A defining a vertical direction. During operation, the milling cutter 52 rotates about the axis of rotation A in a direction of rotation R. A plane P perpendicular to the axis of rotation A defines horizontal directions. The specific application may be, for example, the milling of a shoulder having a vertical wall and a horizontal surface in a workpiece W. The plane P coincides with the horizontal surface of the workpiece W. The cutting insert 10 has an operative corner 29' in contact with the workpiece W. The operative corner 29' has associated cutting edges that participate in the milling process. The operative corner 29' is a leading corner of the cutting insert 10 in the direction of rotation of the milling cutter 52. Associated with the operative corner 29' on the end surface 18 facing the workpiece W is a non-operative corner 29". The non-operative corner 29" does not have associated cutting edges that participate in the milling process. The non-operative corner 29" is a trailing corner of the cutting insert 10 in the direction of rotation of the milling cutter 52.

The cutting insert 10 is tilted at an angle $\alpha$ with respect to the plane P so that the trailing corner is relieved from the surface of the workpiece. The operative corner 29' has an operative corner cutting edge 28 that extends between an operative major cutting edge 22 and an operative minor cutting edge 26. The operative major cutting edge 22 has an operative first major cutting edge section 22a and an operative second major cutting edge section 22b. When milling a shoulder in a workpiece the operative major cutting edge 22 performs the operation of milling the vertical wall and the operative minor cutting edge 26 performs the operation of finishing, or wiping, the surface formed on the workpiece. The operative minor cutting edge 26 is also referred to as a wiper.

Due to the fact that the major cutting edges 22 are concave in a side view of the cutting insert 10 the operative first major cutting edge section 22a has a positive axial rake and the operative second major cutting edge section 22b has a negative axial rake when located in the milling cutter 52. Thus during the milling of a shoulder in a workpiece, the vertical component Fv of the cutting force F operating on the operative first major cutting edge section 22a is in the opposite direction to the vertical component Fv of the cutting force F operating on the operative second major cutting edge section 22b and consequently cancel each other out so that the cutting insert 10 is balanced. In accordance with some embodiments, the vertical components Fv of the cutting forces F operating on the operative major cutting edge 22 approximately cancel each other out so that the cutting insert 10 is approximately balanced.

Figure 5:
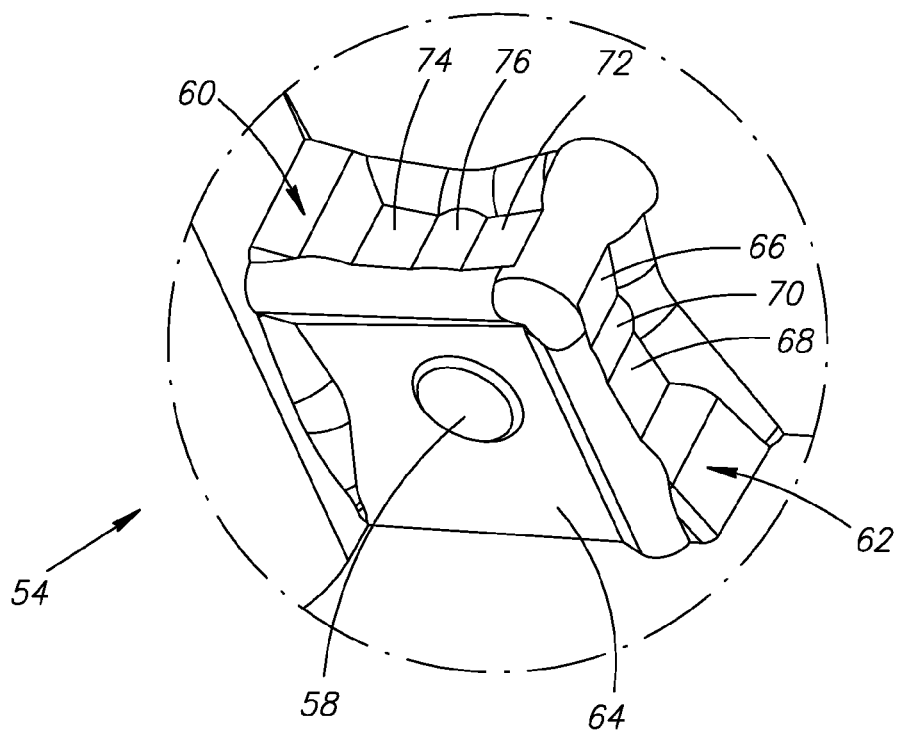
FIG. 5 is a perspective view of an insert pocket in accordance with embodiments of the present invention.

Each cutting insert 10 is secured in an insert pocket 54 of the milling cutter 52 by a clamping screw 56 which is threadingly secured in a threaded bore 58. FIG. 5 shows an insert pocket 54 in accordance with embodiments of the invention. The insert pocket 54 has adjacent upper and rear walls 60, 62 that are oriented transversely to a base wall 64 in which the threaded bore 58 is formed. The rear wall 62 is generally convex and is provided with two protruding tangential location surfaces, an upper tangential location surface 66 adjacent the pocket upper wall 60 and a lower tangential location surface 68 distal the pocket upper wall 60. The two tangential location surfaces are located on either side of a rear central region 70 of the rear wall 62. The rear central region 70 serves to geometrically define the upper and lower tangential location surfaces 66, 68 as separate surfaces. The upper wall 60 is generally convex and is provided with two protruding axial location surfaces, a rear axial location surface 72 adjacent the pocket rear wall 62 and a forward axial location surface 74 distal the pocket rear wall 62. The two axial location surfaces are located on either side of a upper central region 76 of the upper wall 60. The upper central region 76 serves to geometrically define the rear and forward axial location surfaces 72, 74 as separate surfaces.

Figure 6:
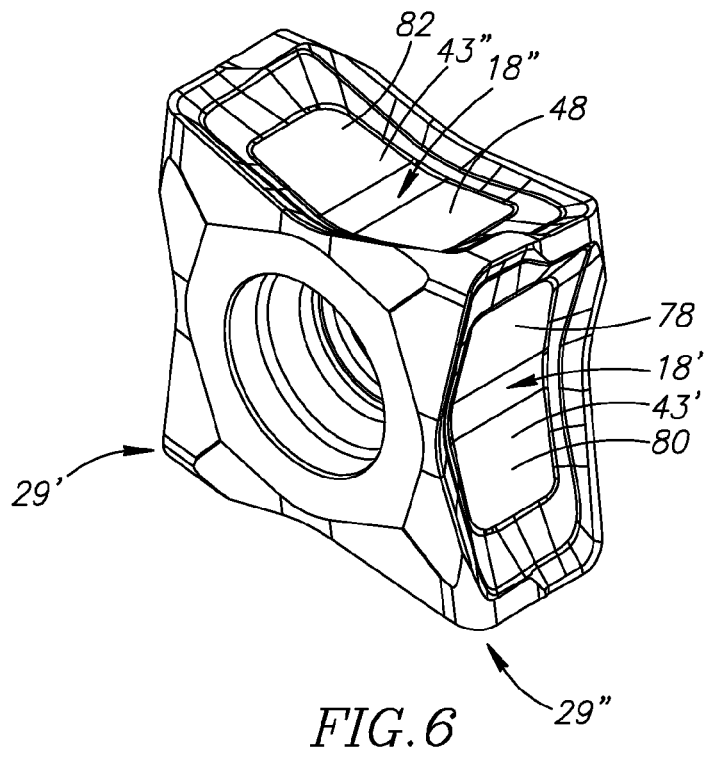
FIG. 6 is a perspective view of a cutting insert in accordance with embodiments of the present invention, showing the end surfaces that engage the insert pocket for a given indexed position of the cutting insert.

Attention is now also drawn to FIG. 6 showing the end surfaces 18 that engage the upper and rear walls 60, 62 of the insert pocket 54 for a given indexed position of the cutting insert 10. When the cutting insert 10 is mounted in the insert pocket 54 the rear wall 62 faces a first end surface 18' having a first inner end surface 43' and the upper wall 60 faces a second end surface 18" having a second inner end surface 43" that is adjacent the first end surface 18'. When the clamping screw 56 is tightened by clockwise screw rotation, the rear wall 62 engages the first inner end surface 43', the upper wall 60 engages the second inner end surface 43" and the base wall 64 engages a radially inner side surface 12 of the cutting insert 10.

Specifically, the upper tangential location surface 66 abuts the first inner end surface 43' at an upper tangential abutment surface 78 and the lower tangential location surface 68 abuts the first inner end surface 43' at a lower tangential abutment surface 80. The forward axial location surface 74 abuts the second inner end surface 43" at a forward axial abutment surface 82 and a gap is formed between the rear axial location surface 72 and a rear axial abutment surface 84 of the second inner end surface 43", that is, the rear axial location surface 84 faces but does not abut the rear axial abutment surface 84.

During a cutting operation, cutting forces operating in the cutting insert 10 tend to rotate the insert anticlockwise about the clamping screw 56 until the rear axial location surface 84 abuts the rear axial location surface 72 and a gap is formed between the forward axial location surface 74 and the forward axial abutment surface 82, thereby ensuring stable three-point abutment actually, three-surface abutment during cutting operations.

In principle, a left-handed screw could be used. This would ensure that the initial three-point contact formed when the clamping screw is tightened by anti-clockwise screw rotation would be maintained during cutting operations. However, left-handed screws are inconvenient to use. Moreover, since they are not common for securing cutting inserts in insert pockets it would be bad human engineering to use them.

Although the present invention has been described to a certain degree of particularity, it should be understood that various alterations and modifications could be made without departing from the scope of the invention as hereinafter claimed.

What is claimed is:

1. A tangential cutting insert (10) comprising two opposing side surfaces (12) and a peripheral surface (14) extending therebetween, the peripheral surface (14) comprising four identical end surfaces (18), each end surface (18) extending between two adjacent end surfaces (18);

each end surface (18) and each side surface (12) intersect at a major edge (20), at least a portion of the major edge (20) being a major cutting edge (22);

each end surface (18) and each adjacent end surface (18) intersect at a minor edge (24), at least a portion of the minor edge (24) being a minor cutting edge (26), the major cutting edges (22) being longer than the minor cutting edges (26);

each of the major and minor cutting edges (26) of a respective end surface (18) have a rake surface (34) associated therewith in the respective end surface (18), the rake surface (34) extending in a inward direction of the cutting insert (10);

wherein, in a side view of the cutting insert (10) the major cutting edges (22) are concave.

2. The tangential cutting insert (10) according to claim 1, wherein the cutting insert (10) has a through bore (16) extending between the side surfaces (12), the through bore (16) having a bore axis (B) about which the cutting insert (10) has 90° rotational symmetry.

3. The tangential cutting insert (10) according to claim 1, wherein adjacent major and minor cutting edges (22, 26) merge at a corner cutting edge (28).

4. The tangential cutting insert (10) according to claim 1, wherein the rake surface (34) extends to an inner end surface (43) of the end surface (18).

5. The tangential cutting insert (10) according to claim 1, wherein a given major cutting edge (22) is formed at the intersection of the rake surface (34) and a major relief surface (42) and a given minor cutting edge (26) is formed at the intersection of the rake surface (34) and a minor relief surface (38), wherein the major relief surface (42) is located in a side surface (12) and the minor relief surface (38) is located in an end surface (18).

6. The tangential cutting insert (10) according to claim 1, wherein each minor cutting edge (26) is formed at the intersection of a minor rake surface (44) and a minor relief surface (38), the minor rake surface (44) being located in the rake surface (34) of one end surface (18) and the minor relief surface (38) being located in an adjacent end surface (18), wherein the minor relief surface (38) forms a support region (50) for the minor cutting edge (26), the support region (50) being elevated relative to an adjacent minor rake surface (44) located in the adjacent end surface (18).

7. The tangential cutting insert (10) according to claim 1, wherein adjacent major and minor cutting edges (26) of each end surface (18) merge at a corner cutting edge (28) and the major cutting edge (22) is located between the corner cutting edge (28) and a corner non-cutting edge (32).

8. The tangential cutting insert (10) according to claim 7, wherein each end surface (18) comprises exactly two diagonally opposing corner cutting edges (28) and exactly two diagonally opposing corner non-cutting edges (32).

9. A milling cutter (52) comprising:
    at least one tangential cutting insert (10) in accordance with claim 1; and
    at least one insert pocket (54) in which the tangential cutting insert (10) is retained.

10. The milling cutter (52) according to claim 9, wherein:
the cutting insert (10) comprises:
    a first end surface (18') having a first inner end surface (43') comprising an upper tangential abutment surface (78) and a lower tangential abutment surface (80); and
    a second end surface (18") adjacent the first end surface (18'), the second end surface (18") a second inner end surface (43") comprising a forward axial abutment surface (82) and a rear axial abutment surface (84);
the insert pocket (54) comprises:
    generally convex adjacent upper and rear walls (60, 62) oriented transversely to a base wall (64);
    an upper wall (60) comprises two protruding axial location surfaces, located on either side of an upper central region (76) of the upper wall (60), including a rear axial location surface (72) adjacent the pocket rear wall (62) and a forward axial location surface (74) distal the pocket rear wall (62);
    the rear wall (62) comprises two protruding tangential location surfaces, located on either side of a rear central region (70) of the rear wall (62), including an upper tangential location surface (66) adjacent the pocket upper wall (60) and a lower tangential location surface (68) distal the pocket upper wall (60);
when the cutting insert is secured in the insert pocket:
    the rear wall (62) engages the first inner end surface (43'), with the rear wall's upper tangential location surface (66) abutting upper tangential abutment surface (78) and the rear wall's lower tangential location surface (68) abutting the lower tangential abutment surface (80);
    the upper wall (60) engages the second inner end surface (43"); and
    the base wall (64) engages a radially inner side surface (12) of the cutting insert (10);
and wherein:
    the cutting insert is moveable from a first position obtained by tightening a clamping screw (56) by clockwise screw rotation to a second position created by cutting forces operating on the cutting insert during a cutting operation; wherein
    in the first position the forward axial location surface (74) abuts the second inner end surface (43") at the forward axial abutment surface (82) and a gap is formed between the rear axial location surface (72) and the rear axial abutment surface (84) of the second inner end surface (43"); and
    in the second position the rear axial location surface (72) abuts the rear axial abutment surface (84) and a gap is formed between the forward axial location surface (74) and the forward axial abutment surface (82).

* * * * *